(12) United States Patent
Vikramaditya et al.

(10) Patent No.: US 8,045,282 B2
(45) Date of Patent: Oct. 25, 2011

(54) MEASUREMENT OF TRACK ECCENTRICITY ON BIT PATTERNED MEDIA

(75) Inventors: Barmeshwar Vikramaditya, Eden Prairie, MN (US); Sundeep Chauhan, Fremont, CA (US); Patrick John Korkowski, Bloomington, MN (US)

(73) Assignee: Seagate Technology LLC, Cupertino, CA (US)

(*) Notice: Subject to any disclaimer, the term of this patent is extended or adjusted under 35 U.S.C. 154(b) by 0 days.

(21) Appl. No.: 12/364,784

(22) Filed: Feb. 3, 2009

(65) Prior Publication Data
US 2010/0195235 A1 Aug. 5, 2010

(51) Int. Cl.
*G11B 27/36* (2006.01)
*G11B 19/02* (2006.01)
*G11B 5/596* (2006.01)

(52) U.S. Cl. .......................... 360/31; 360/77.04; 360/71
(58) Field of Classification Search .................. None
See application file for complete search history.

(56) References Cited

U.S. PATENT DOCUMENTS

| | | | |
|---|---|---|---|
| 4,445,144 A * | 4/1984 | Giddings | 348/96 |
| 5,136,439 A | 8/1992 | Weispfenning et al. | |
| 5,668,678 A | 9/1997 | Reed et al. | |
| 5,739,972 A | 4/1998 | Smith et al. | |
| 6,005,363 A | 12/1999 | Aralis et al. | |
| 6,181,505 B1 | 1/2001 | Sacks et al. | |
| 6,233,106 B1 | 5/2001 | Chambers | |
| 6,643,082 B1 | 11/2003 | Belser | |
| 6,643,090 B1 | 11/2003 | Pruett | |
| 6,657,809 B2 | 12/2003 | Ottesen et al. | |
| 6,678,110 B2 | 1/2004 | Ellis | |
| 6,751,035 B1 | 6/2004 | Belser | |
| 7,161,753 B2 | 1/2007 | Wachenschwanz et al. | |
| 2002/0132083 A1 | 9/2002 | Weller et al. | |
| 2003/0174594 A1 * | 9/2003 | Eytan et al. | 369/44.13 |
| 2005/0157597 A1 | 7/2005 | Sendur et al. | |
| 2006/0209650 A1 * | 9/2006 | Choi | 369/47.44 |
| 2007/0092650 A1 | 4/2007 | Albrecht et al. | |
| 2009/0195911 A1 * | 8/2009 | Shibano et al. | 360/75 |
| 2009/0244765 A1 * | 10/2009 | Albrecht | 360/75 |

* cited by examiner

*Primary Examiner* — Andrew L Sniezek
(74) *Attorney, Agent, or Firm* — Deirdre Megley Kvale; Westman, Champlin & Kelly, P.A.

(57) ABSTRACT

The eccentricity of tracks defined on a rotating bit patterned media are measured using a readback signal, and the measured eccentricity may be used to control centering of the disk relative to a rotational spindle and/or to control movement of a read/write head relative to a selected track on the disk.

20 Claims, 5 Drawing Sheets

MEASUREMENT OF TRACK ECCENTRICITY ON BIT PATTERNED MEDIA

BACKGROUND

The present invention generally relates to data storage media and devices, and more particularly to data storage devices including bit patterned media.

In conventional magnetic data storage media, data bits are recorded using magnetic transitions on a magnetic recording layer that is composed of a random arrangement of single-domain particles. That is, the magnetic recording layer is typically a thin film of a magnetic material that includes a random arrangement of nanometer-scale grains, each of which behaves as an independent magnetic element. Each recorded bit may be made up of many (50-100) of these random grains.

A stream of data bits is recorded as regions of opposite magnetization on the magnetic recording layer. The boundaries between regions of opposite magnetization occur along the boundaries between the grains. Because the magnetic transitions follow the grain boundaries, the transitions are typically not made along straight lines. Thus, due to the granular nature of the recording layer, the transitions may not be placed exactly where they are intended. Any deviations in grain boundaries represent medium noise, which limits the density of data that can be recorded on the medium.

If the grains are small enough, the magnetic transitions may be straight enough that it is easy to detect which bit cells contain a boundary and which do not. However, if the recording density is increased for a given grain size, the magnetic transitions become proportionally noisier and likely less thermally stable, thereby reducing the ability of the system to accurately recover the data.

An alternative to conventional magnetic recording approaches is to use a bit patterned media (BPM) technique. In bit patterned media, the bits do not contain as many grains as those in conventional media. Instead, bit patterned media comprise arrays of magnetic islands which are defined on a nonmagnetic disk surface during manufacturing. The magnetic islands can be magnetized to a desired polarity one at a time by a magnetic field generated by a write head passing over the islands. The magnetic islands (referred to herein as "dots") are physically separated from each other by regions of non-magnetic material. These nonmagnetic regions are referred to herein as "gaps" or "spaces." Thus, the magnetic field generated by a write head in response to a write current can change the magnetization of the dots, while the gaps remain unmagnetized.

Each island, or transition between islands, may represent one bit of information. The signal-to-noise ratio of a bit patterned medium is determined by variations in the spacing and sizing of islands, and can be improved considerably beyond that of conventional media recording schemes.

As the areal density of magnetic disc drives increases, so does the need for more precise control of the location of individual magnetic dots forming tracks, the location of tracks on the disk, the centering of disks relative to their axis of rotation, and the control of head movement while following a designated track.

SUMMARY

The eccentricity of tracks defined on a rotating bit patterned media are measured using a readback signal, and the measured eccentricity may be used to control centering of the disk relative to a rotational spindle and/or to control movement of a read/write head relative to a selected track on the disk.

In some embodiments, a circuit includes a module that measures an amount of eccentricity of tracks on a rotating disk in response to amplitude variation in a readback signal from a bit patterned media pattern that includes a plurality of dots arranged in a down-track orientation and in a cross-track orientation.

In some other embodiments, an amount of eccentricity of tracks on a rotating disk is measured in response to amplitude variation in a readback signal from a bit patterned media pattern that includes a plurality of dots arranged in a down-track orientation and in a cross-track orientation.

In some other embodiments, a disk stack alignment apparatus includes a track eccentricity determination circuit and a disk positioning unit. The track eccentricity determination circuit measures an amount of eccentricity of tracks on a rotating disk in response to amplitude variation in a readback signal from a bit patterned media pattern that includes a plurality of dots arranged in a down-track orientation and in a cross-track orientation. The disk positioning unit controls centering of the disk relative to a rotational spindle in response to the measured amount of eccentricity of the tracks.

DESCRIPTION OF THE DRAWINGS

The accompanying drawings, which are included to provide a further understanding of the invention and are incorporated in and constitute a part of this application, illustrate certain embodiments of the invention. In the drawings.

DETAILED DESCRIPTION

Figure 1:
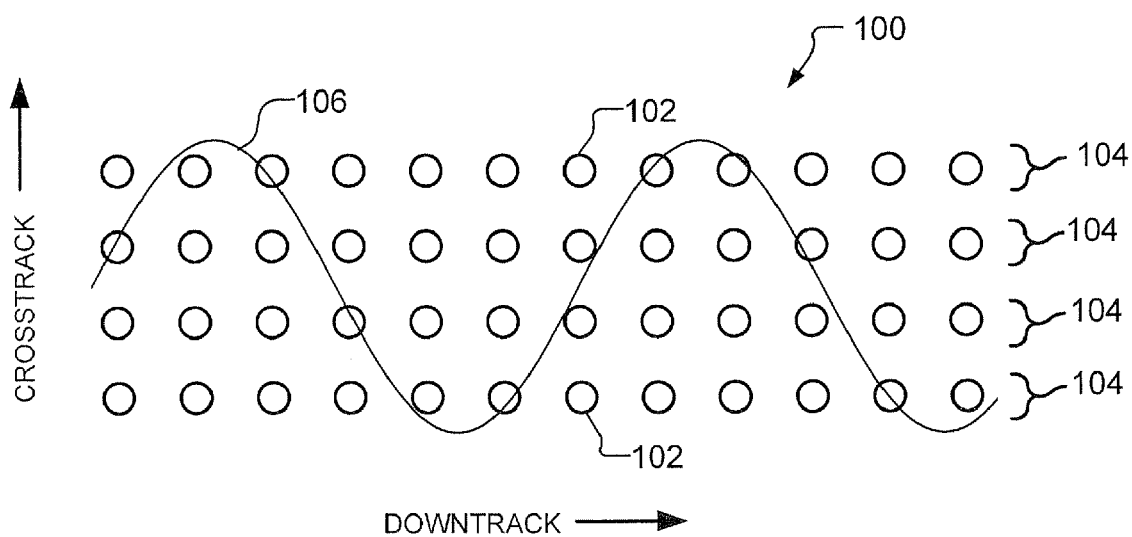
FIG. 1 illustrates the crosstrack and downtrack trajectory of bit patterned magnetic dots, which are arranged on an eccentrically rotating media, relative to a read/write head.

Various embodiments of the present invention will now be described more fully hereinafter with reference to the accompanying drawings. However, this invention should not be construed as limited to the embodiments set forth herein.

Rather, these embodiments are provided so that this disclosure will be thorough and complete, and will convey the scope of the invention to those skilled in the art.

It will be understood that, as used herein, the term "comprising" or "comprises" is open-ended, and includes one or more stated elements, steps and/or functions without precluding one or more unstated elements, steps and/or functions. As used herein, the singular forms "a", "an" and "the" are intended to include the plural forms as well, unless the context clearly indicates otherwise. The term "and/or" and "/" includes any and all combinations of one or more of the associated listed items. In the drawings, the size and relative sizes of regions may be exaggerated for clarity. Like numbers refer to like elements throughout.

It will be understood that, although the terms first, second, etc. may be used herein to describe various elements, these elements should not be limited by these terms. These terms are only used to distinguish one element from another. For example, a first region/element/value could be termed a second region/element/value, and, similarly, a second region/element/value could be termed a first region/element/value without departing from the teachings of the disclosure.

Some embodiments may be embodied in hardware and/or in software (including firmware, resident software, microcode, etc.). Consequently, as used herein, the term "signal" may take the form of a continuous waveform and/or discrete value(s), such as digital value(s) in a memory or register. Furthermore, various embodiments may take the form of a computer program product on a computer-usable or computer-readable storage medium having computer-usable or computer-readable program code embodied in the medium that is executable by a processor to perform functionality described herein. Accordingly, as used herein, the terms "circuit" and "module" may take the form of digital circuitry, such as computer-readable program code executed by a processor (e.g., general purpose microprocessor and/or digital signal processor), and/or analog circuitry.

Embodiments are described below with reference to block diagrams and operational flow charts. It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Although various embodiments of the present invention are described in the context of disk drives for purposes of illustration and explanation only, the present invention is not limited thereto. It is to be understood that the present invention can be more broadly used for any type of servo control loop that positions a sensor relative to bit patterns on a movable bit patterned media.

In a Bit Patterned Media (BPM) recording scheme, a pattern of magnetic islands, or dots, on the media surface are selectively magnetized in a desired pattern to store data. Data may be encoded in magnetic transitions from dot to dot and/or may be encoded by the physical arrangement of dots and gaps on the media surface. Servo information that is used to control positioning of a read/write head may be similarly encoded in the magnetic transitions from dot to dot and/or may be encoded in the spacing and/or sizing of dots on the media surface, however, the embodiments described here do not implicitly require such patterning.

FIG. 1 illustrates the crosstrack and downtrack trajectory of bit patterned magnetic dots, which are arranged on an eccentrically rotating media, relative to a read/write head. Referring to FIG. 1, a disk surface 100 includes a plurality of patterned magnetic islands (i.e., dots) 102 which are arranged along parallel tracks 104 in a downtrack direction. As the disk surface 100 rotates, a write head can be aligned with a selected one of the tracks 104 and switched or pulsed with electric current to record data by magnetizing adjacent magnetic dots 102 to a desired polarization (e.g. a positive or negative polarization).

As the disk surface 100 rotates, the magnetic dots 102 may move in a crosstrack direction (i.e., toward the inner/outer diameter ID of the disk) relative to a stationary read/write head, as indicated by the path 106, so that the magnetic dots 102 may appear to move back and forth in a crosstrack direction relative to the stationary head. Such movement can be caused by eccentric rotation of the disk surface due to, for example, slop between the inner diameter of the disk and a hub of a spindle motor, by dot placement errors on the disk surface, and/or by eccentricity in the pattern of patterned magnetic dots 102 along the tracks 104.

During manufacture of a disk drive, it can be beneficial to be able to determine disk eccentricity after the disk has been mounted to the hub of a spindle motor so that, for example, the disk may be more accurately centered relative to the hub to avoid eccentric rotation and associated crosstrack movement relative to the head. Furthermore, it can be beneficial to determine disk eccentricity before dedicated servo patterns have been recorded on the disk.

In accordance with some embodiments, eccentricity of a BPM can be measured using a readback signal as the head reads the magnetic dots 102 without requiring use of prerecorded dedicated servo patterns. The measured eccentricity data may then be used to assist with disk centering (alignment) during manufacture of a disk drive and/or as a feedforward signal that may be used during head positioning by a servo controller to better track the crosstrack movement of the magnetic dots 102 as the disk rotates.

Figure 2:
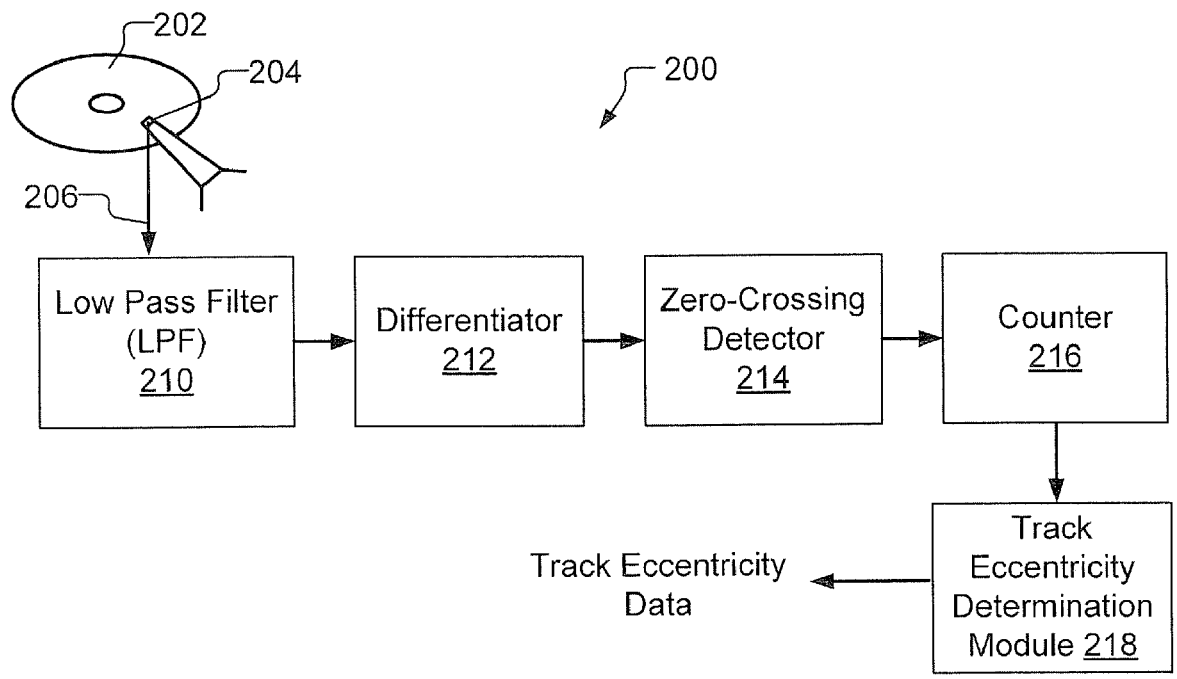
FIG. 2 illustrates a block diagram of a circuit that measures amount of track eccentricity on a rotating disk in accordance with some embodiments.

FIG. 2 illustrates a block diagram of a circuit 200 that measures eccentricity in tracks on a rotating BPM disk 202 in accordance with some embodiments. Referring to FIG. 2, the circuit 200 includes a low pass filter (LPF) 210, a differentiator 212, a zero-crossing detector 214, a counter 216, and a track eccentricity determination module 218.

As the magnetic dots 102 move past a head 204, a readback signal is generated whose amplitude is modulated in response to the crosstrack movement of the head 204 relative to the tracks of magnetic dots 102. For a DC erased bit-patterned media, the readback signal from the magnetic dots 102 may be modeled as a sine wave with a fundamental frequency of N dots/inch. When the disk has a rotational velocity of one revolution in K seconds, the analog readback signal 206 from the head 204 can be represented by the following equation:

$$readback\ signal = \sin\left(\frac{2\pi N}{K}t\right),$$

where t is the sampling instant.

When the head 204 moves eccentrically relative to the tracks, the amplitude of the readback signal 206 is modulated in response to the crosstrack radial distance that the head 204 moves relative to the center of the magnetic dots 102 along the tracks. When that the head 204 moves eccentrically through an array of magnetic dots 102 with an eccentricity of E μinches, where the track density is L μinches/track, then the resulting number of tracks traversed by the head 204 is a ratio of E/L and the resulting readback signal 206 can be represented by the following equation:

$$\text{readback signal} = \sin\left(\frac{2\pi N}{K}t + \frac{E}{L} * \sin\left(\frac{2\pi}{K}t + \phi\right)\right),$$

where φ is the fundamental frequency.

Accordingly, the eccentric trajectory 106 causes phase modulation in the readback signal 206, which can be used to measure eccentricity of the BPM. The eccentricity can be directly estimated by measuring the phase modulation and/or by measuring the related frequency modulation in the readback signal 206. However, such measurement will require the use of very high frequency bandwidth circuitry (e.g., 3 to 6 GHz), which can be overly expensive and sensitive to noise in the readback signal given the high-density of dots in the downtrack direction and spin speed of the discs. In sharp contrast, a relatively simple circuit may instead be used to determine the eccentricity from the amplitude modulation in the readback signal 206 by counting the number of tracks of eccentricity as the disk 202 rotates. This is an approximation to the non-causal Hilbert transform.

Figure 3:
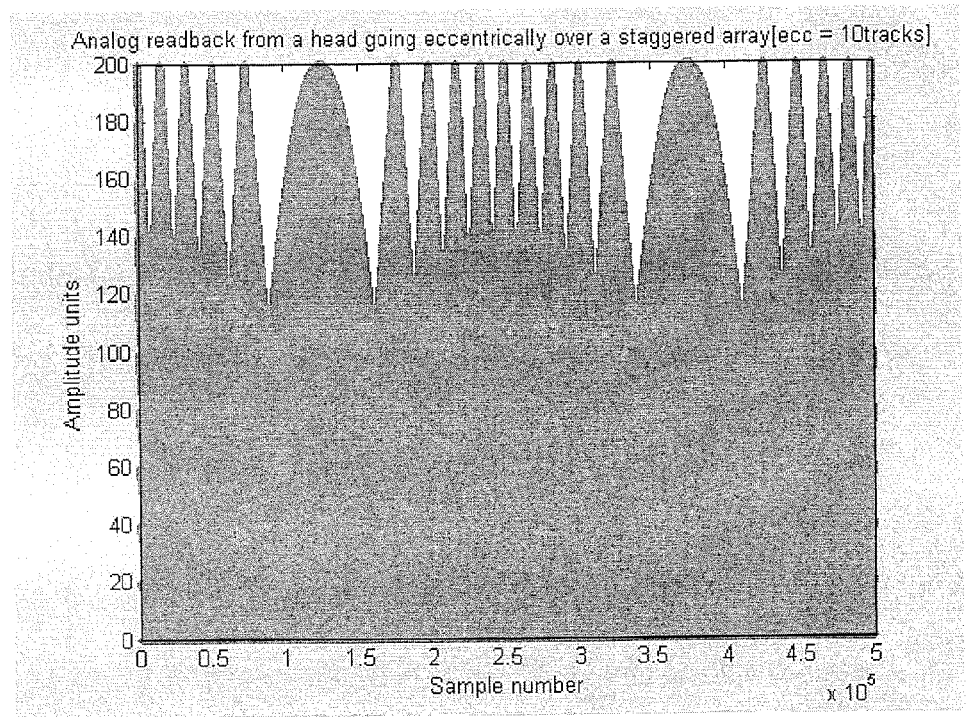
FIG. 3 illustrates a graph of an analog readback signal from a head reading eccentrically rotating bit patterned tracks on a disk in accordance with some embodiments.

For purposes of exemplary explanation only, the readback signal 206 is modeled to exhibit the amplitude modulation shown in FIG. 3 as the head 204 reads the BPM. In FIG. 3, a square readback wave is assumed to simulate the readback signal from the BPM and ten tracks of eccentricity are assumed to occur over 500 kBits in the downtrack direction. The illustrated envelope can be detected by using various types of envelope detectors, such as one configured for AM demodulation.

Figure 4:
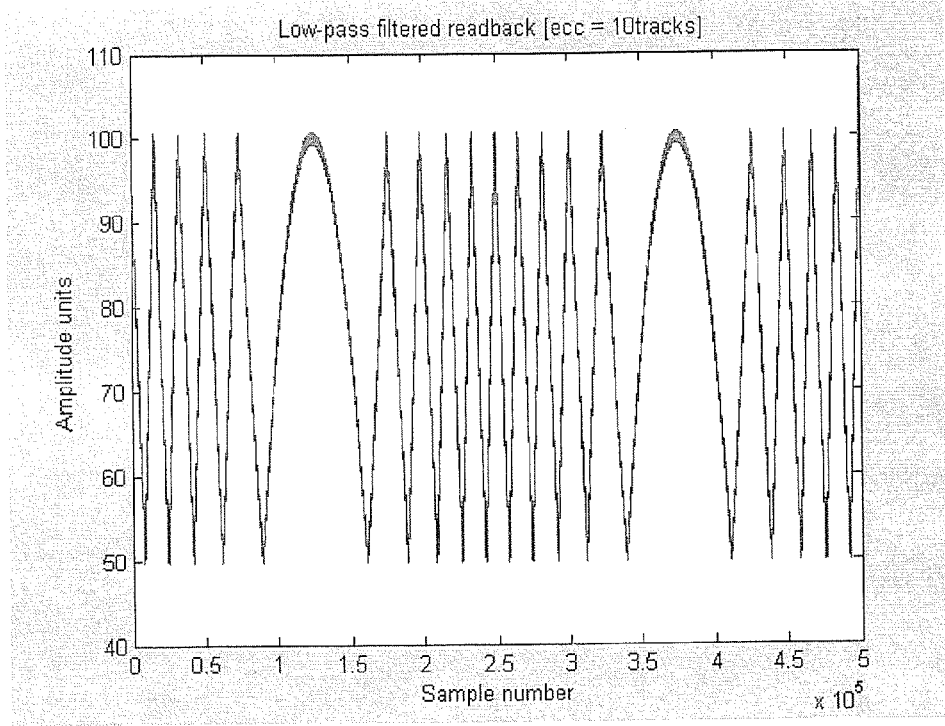
FIG. 4 illustrates a graph of the result of low pass filtering the analog readback signal of FIG. 3 in accordance with some embodiments.

The analog readback signal 206 is low-pass filtered by the LPF 210 to generate a filtered signal. The LPF 210 may be tuned to substantially attenuate frequencies in the readback signal 206 that correspond to a rate of occurrence of the magnetic dots 102 in the downtrack direction (e.g., filter out signal components at or above the fundamental frequency of the readback rate of the magnetic dots 102 in the downtrack direction). Accordingly, the filtered readback signal 206 indicates the crosstrack movement of the tracks relative to the head 204. FIG. 4 illustrates a graph of an exemplary output of the low pass filter 210 when filtering the readback signal of FIG. 3 in accordance with some embodiments.

The differentiator 212 differentiates the filtered readback signal 206 over time to generate a rate signal. The zero-crossing detector 214 generates a zero-crossing signal that indicates occurrence of zero-crossings in the rate signal (i.e., indicates the number of tracks 104 cross by the head 204 due to the crosstrack trajectory 106). The counter 216 counts the zero-crossings, and the track eccentricity determination module 218 measures the amount of eccentricity of the tracks 104 in response to the counted number of zero-crossings (from the counter 216) over a defined time period. The measured amount of eccentricity is output as track eccentricity data for use by other circuitry, such as for display to an operator and/or by an automated disk stack alignment apparatus that is attempting to center the disk 202 on a hub, and/or for use by a servo controller to compensate for the measured disk eccentricity.

Referring to FIG. 4, it is seen that there are 20 peaks or alternatively level-shifting of the filtered readback signal and that the counter 216 would count the same number of zero-crossings. The module 218 determines the number of tracks of eccentricity (e.g., the crosstrack distance that the head 204 moves due to eccentricity) as a defined ratio of (e.g., ½) the counted number of zero-crossings.

Figure 5:
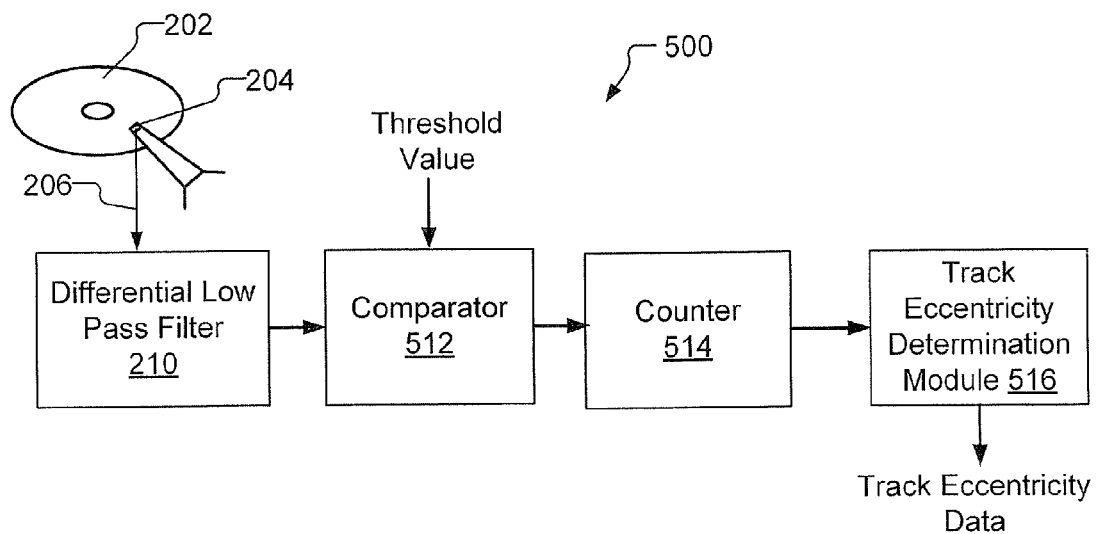
FIG. 5 illustrates a block diagram of another circuit that measures amount of track eccentricity on a rotating disk in accordance with some other embodiments.

FIG. 5 illustrates a block diagram of another circuit 500 that measures amount of track eccentricity on a rotating disk in accordance with some other embodiments. Referring to FIG. 5, the circuit includes a low pass filter 210, a comparator 512, a counter 514, and track eccentricity determination module 516. The low pass filter 210 may be configured to operate as described above for FIG. 2. The comparator compares the filtered readback signal to a threshold value to detect peaks, and outputs a peak detection signal that cycles in response to detecting each peak. The counter 514 counts the number of peaks indicated by the peak detection signal. The module 516 uses the counted number of peaks over a defined time period to generate track eccentricity data that indicates an amount of crosstrack eccentricity in the tracks.

Figure 6:
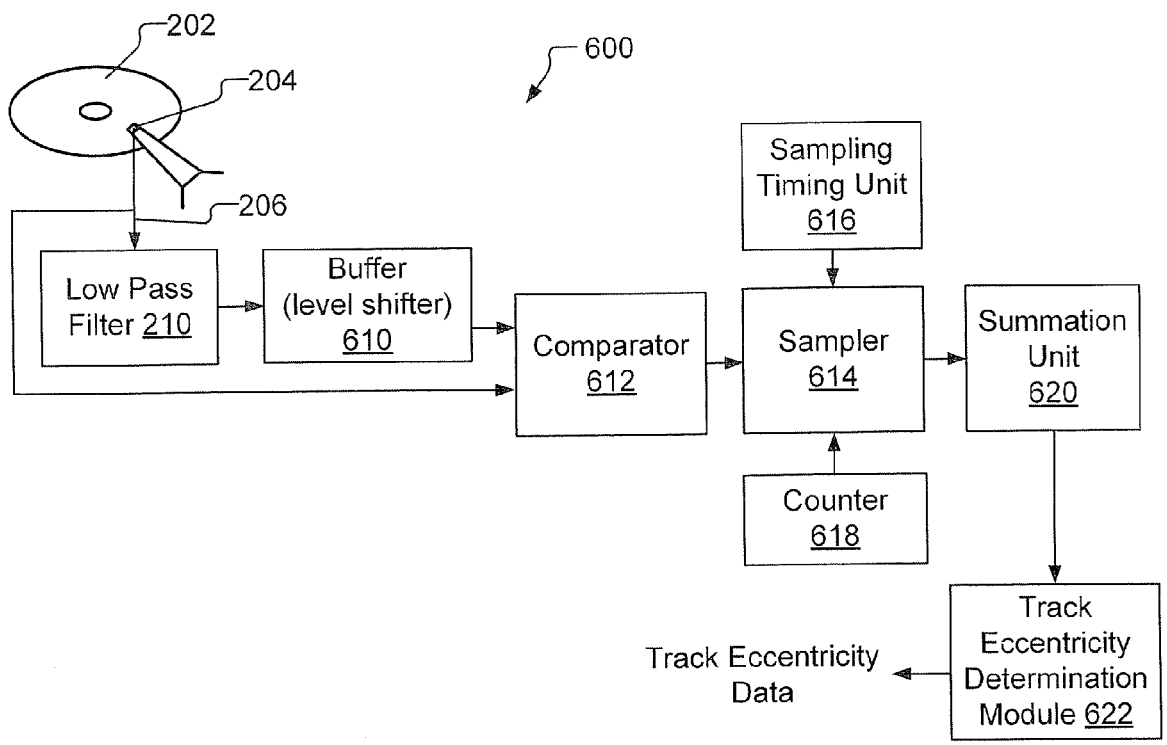
FIG. 6 illustrates a block diagram of another circuit that measures amount of track eccentricity on a rotating disk in accordance with some other embodiments.
Figure 7:
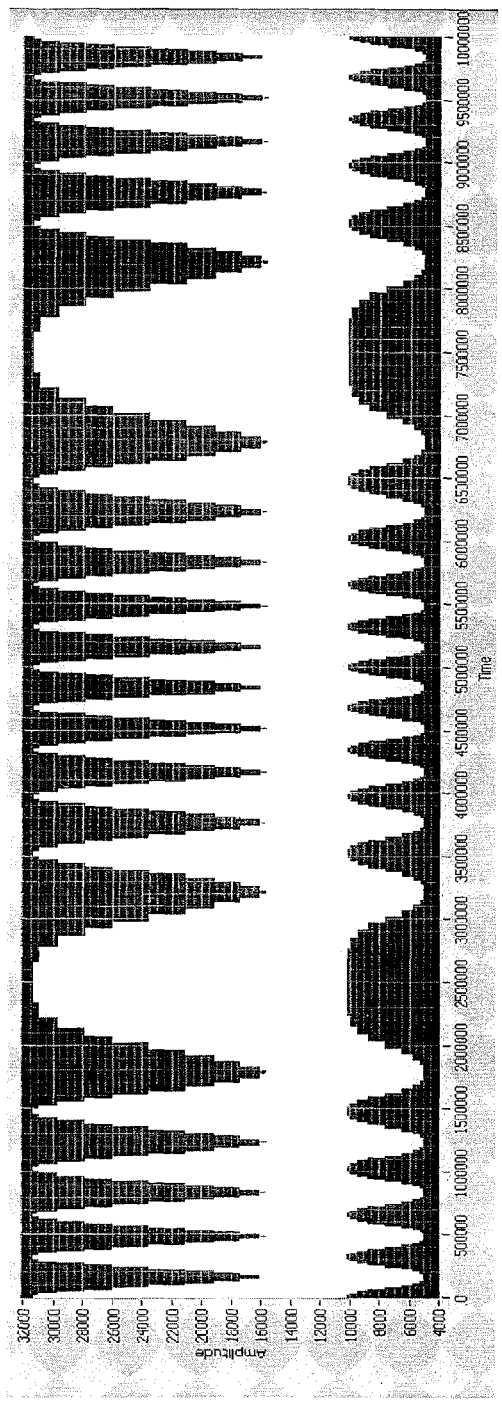
FIG. 7 illustrates a graph of an analog readback signal.

FIG. 6 illustrates a block diagram of another circuit 600 that measures the amount of track eccentricity on a rotating disk 202 in accordance with some other embodiments. FIG. 7 illustrates a graph of an analog readback signal from the head 204 of FIG. 6. The readback signal contains frequency modulation due to dot placement errors, spindle velocity variation, reader motion and eccentricity. However, the frequency contents of the various disturbance sources are significantly different. This can be exploited to measure the eccentricity by subsampling the readback and using a counter to measure the timing variation on bit islands over a revolution, which is directly proportional to the eccentricity of the media. Referring to FIG. 6, the circuit includes a low pass filter 210, a buffer 610, a comparator 612, a sampler 614, a sampling timing unit 616, a counter 618, a summation unit 620, and a track eccentricity determination module 622.

Figure 8:
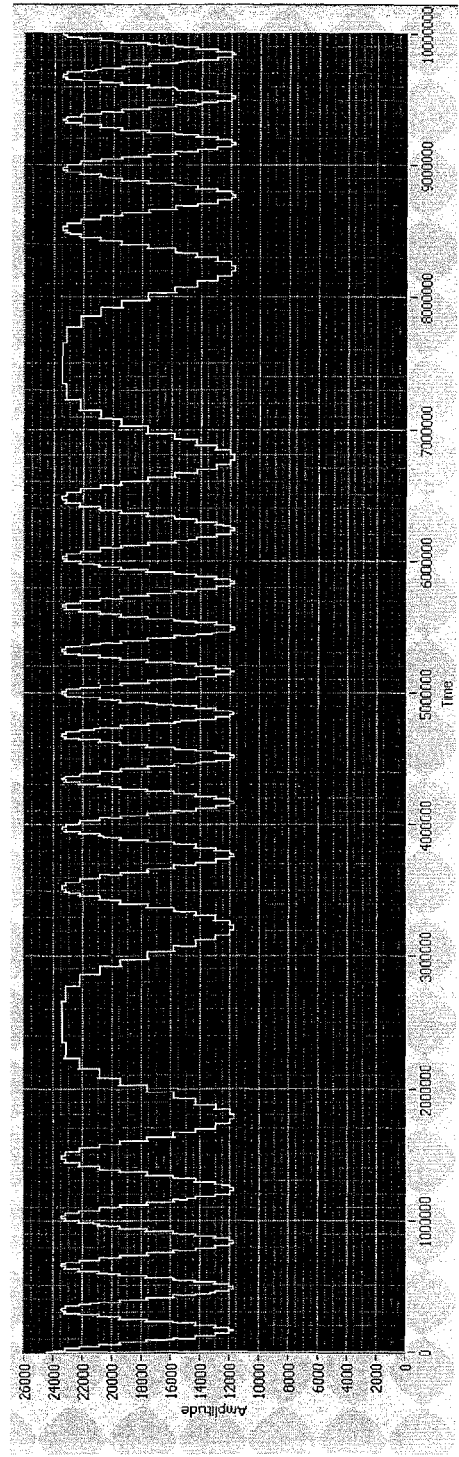
FIG. 8 illustrates a graph of the analog readback signal of FIG. 7 after low pass filtering.

The low pass filter 210 may operate as described above for FIG. 2 to low pass filter the ac-coupled readback signal 206 and attenuate frequency components at or above the rate of the magnetic dots 102 in the downtrack direction. FIG. 8 illustrates a graph of the analog readback signal of FIG. 7 after low pass filtering by the low pass filter 210. The low pass filtered signal is passed to the buffer 610 that generates a threshold signal that controls the comparator 612.

The comparator compares the level-shifted threshold signal from the buffer 610 to the filtered readback signal 206 to generate a signal (e.g., a square wave) that clocks the sampler 614 to sample the output of a free-running counter 618 after a programmed time delay that is controlled by the sampling timing unit 616. This results in translating the frequency modulation of the filtered readback signal into modulated counter values, which can be accumulated over a revolution of the disk or used in real-time to directly estimate the eccentricity by scaling with the sampling interval of the counter 618.

The counter 618 can output free running counter values (e.g., counting cycles of a periodic clock signal). The sampling timing unit 616 can be configured to cause periodic sampling of the counter 618, where the periodic sampling may function to sub-sample over a full revolution or over a defined angular rotation of the disk 202. Accordingly, the sampling timing unit 616 can function to provide periodic sub-sampling of the zero-crossings of the readback signal 206.

The counter values sampled by the sampler 614 are accumulated by the summation unit 620. The counter values may be accumulated over a full revolution or over a defined angular rotation of the disk 202, and may be used by the track eccentricity determination module 622 to estimate the eccentricity of the tracks on the disk 202, such as by scaling the accumulated counter values by the sampling interval to provide an indication of the number of tracks that are traversed in the crosstrack direction by the head 204.

The track eccentricity determination circuits 200, 500, and 600 are not limited to use with the exemplary DC erased regular magnetic dot array shown in FIG. 1. Instead, it is to be understood that the circuits 200, 500, and 600 may be configured for use with any type of repetitive magnetic dots of a BPM. When the circuit 200 is used to determine eccentricity for some bit-patterns such as a staggered configuration, the filtered readback signal may be passed through a threshold detector to generate an output signal that is provided to the zero-crossing detector 214 for processing as described above.

The amplitude of the filtered signal indicates how far the head 204 is currently from the nearest track. A relationship between the amplitude of the filtered signal and the distance that the head 204 is located from the center of the magnetic dots 102 along a track may be calibrated once and then used for real-time position feedback. The ratio of the number of peaks to the amount of track eccentricity may be a defined integer value irrespective of the bit packing structure, and may be calibrated during manufacture of the disk drive.

As will be described further below, the circuits 200, 500, and 600 may provide the track eccentricity data to, for example, a disk stack alignment apparatus and/or to a servo controller which controls head positioning to compensate for the track eccentricity.

Figure 9:
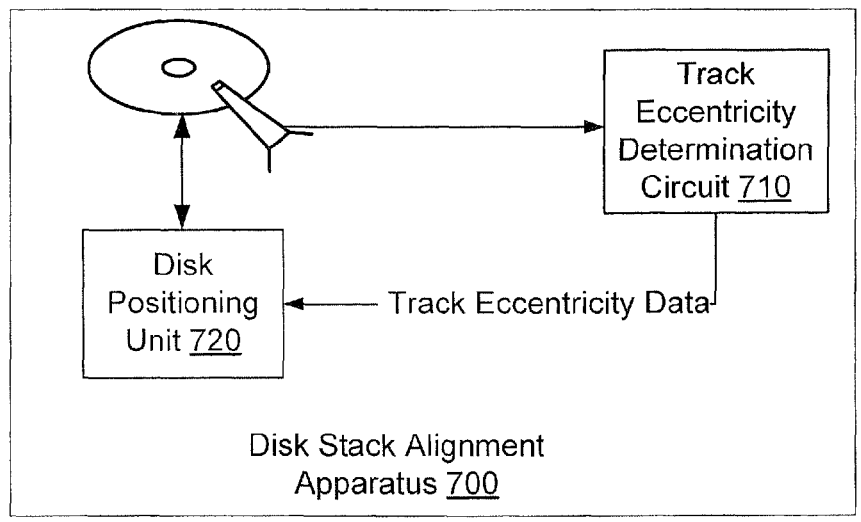
FIG. 9 illustrates a block diagram of a disk stack alignment apparatus that attempts to compensate for measurements of track eccentricity on a rotating disk in accordance with some embodiments.

FIG. 9 illustrates a block diagram of a disk stack alignment apparatus 700 in accordance with some other embodiments. The alignment apparatus 700 may be part of a manufacturing station where disk(s) are clamped to a spindle and then adjusted to be centered relative to the spindle to minimize eccentricity. The alignment apparatus 700 can include a track eccentricity determination circuit 710 and a disk positioning unit 720. The track eccentricity determination circuit 710 can be configured to generate track eccentricity data according to one or more of the embodiments described above with regard to FIGS. 2, 5, and 6. The disk positioning unit 702 can be configured to dynamically respond to the track eccentricity data by adjusting the position of one or more of the disks relative the spindle to attempt to center the disk(s) on the spindle and, thereby, minimize eccentricity of the rotating disk(s). For example, the disk positioning unit 702 may iteratively bias the disk(s) through an actuator mechanism in directions that minimize the magnitude of the track eccentricity and/or may provide visual/audio cues to a human operator who moves the disk(s) to attempt to minimize the magnitude of the track eccentricity.

Figure 10:
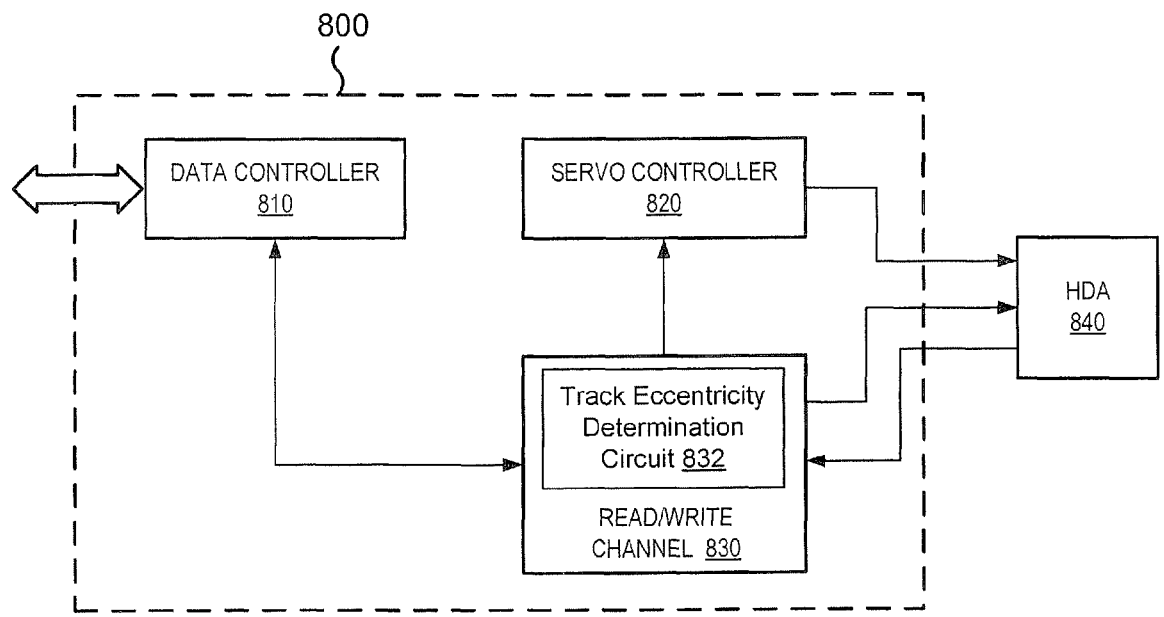
FIG. 10 illustrates a block diagram of disk drive electronics that control head positioning in response to measurements of track eccentricity on a rotating disk in accordance with some embodiments.

FIG. 10 illustrates a block diagram of disk drive electronic circuits 800 that control head positioning in response to measurements of an amount of eccentricity of tracks on a rotating disk in accordance with some other embodiments. Referring to FIG. 10, the circuits 800 can include a data controller 810, a servo controller 820, and a read write channel 830. Although two separate controllers 810 and 820 and a read write channel 830 have been shown for purposes of illustration and discussion, it is to be understood that their functionality described herein may be integrated within a common integrated circuit package or distributed among more than one integrated circuit package. A head disk assembly (HDA) 840 can include a plurality of data storage disks, a plurality of heads mounted to respective arms and which are moved radially across different data storage surfaces of the disks by a head actuator (e.g., voice coil motor), and a spindle motor which rotates the disks.

In accordance with some embodiments, a track eccentricity determination circuit 832 may be included in the read/write channel 830, and/or within another component of the circuits 800 (e.g., within the servo controller 820). The track eccentricity determination circuit 832 can be configured to generate track eccentricity data according to one or more of the embodiments described above with regard to FIGS. 2, 5, and 6. The servo controller 820 can be configured to respond to the track eccentricity data by positioning the head(s) to minimize the magnitude of the track eccentricity data and, thereby, move the head(s) to better track crosstrack movement of the tracks due to the track eccentricity. Accordingly, the servo controller 820 may position a head during track following in response to a position error signal that is generated from servo information and, further, in response to the track eccentricity data.

In the drawings and specification, there have been disclosed typical preferred embodiments of the invention and, although specific terms are employed, they are used in a generic and descriptive sense only and not for purposes of limitation, the scope of the invention being set forth in the following claims.

What is claimed is:

1. An apparatus comprising:
hardware that measures an amount of eccentricity of tracks on a rotating disk in response to amplitude variation in a readback signal from a bit patterned media pattern that includes a plurality of dots arranged in a down-track orientation and in a cross-track orientation;
wherein the hardware counts a number of amplitude variation cycles in the readback signal over a defined time period, and measures the amount of eccentricity in response to the counted number of amplitude variation cycles in the readback signal.

2. The apparatus of claim 1, further comprising:
a disk positioning unit that is configured to control centering of the disk relative to a rotational spindle in response to the measured amount of eccentricity of the tracks.

3. The apparatus of claim 1, further comprising:
a servo controller circuit that is configured to control movement of a read/write head relative to a selected track in response to the measured amount of eccentricity of the tracks.

4. The apparatus of claim 1, wherein the hardware counts the number of amplitude variation cycles limited to within a defined frequency range of the readback signal corresponding to an expected rate of occurrence of the plurality of dots in the cross-track orientation due to track eccentricity.

5. The apparauts of claim 1, wherein the hardware comprises a delay circuit that triggers output of the counted number of amplitude variation cycles in the readback signal responsive to each revolution of the disk.

6. The apparatus of claim 1, wherein the hardware measures a range of the eccentricity on the rotating disk as one-half the counted number of amplitude variation cycles in the readback signal.

7. An apparatus comprising one or more hardware components and/or computer readable program code stored on a computer readable storage media configured to form a circuit comprising:
a differentiator to differentiate a readback signal from a bit patterned media including a plurality of dots arranged in a down-track orientation and in a cross-track orientation;
a zero-crossings detector configured to detect zero crossings in the differentiated readback signal; and
measurement circuitry configured to count the zero crossings in the differentiated readback signal and output an eccentricity measurement in response to the counted number of zero-crossings in the differentiated readback signal.

8. The apparatus of claim 7, and further comprising a low pass filter configured to filter the readback signal before differentiating the readback signal wherein the low pass filter is tuned to substantially attenuate frequencies in the readback signal that correspond to a readback rate of the plurality of dots in the down-track orientation.

9. An apparatus comprising one or more hardware components and/or computer readable program code stored on a computer readable medium configured to form a circuit comprising:
   detection circuitry configured to detect peaks in a readback signal from a bit patterned media corresponding to a cross-track orientation over a time; and
   measurement circuitry configured to count the number of peaks in the readback signal corresponding to the cross-track orientation and output an eccentricity measurement in response to the counted number of peaks.

10. The apparatus of claim 9, wherein the detection circuitry comprises a filtering component tuned to attenuate frequencies in the readback signal that correspond to a readback rate of a plurality of dots on the bit patterned media in a down-track orientation to detect the peaks in the readback signal corresponding to the cross-track orientation.

11. A method comprising:
    counting a number of amplitude variation cycles in a readback signal from a bit patterned media on a disk corresponding to a cross-track orientation over a time period; and
    measuring an amount of eccentricity of tracks on the disk in response to the number of amplitude variation cycles in the readback signal corresponding to the cross-track orientation.

12. The method of claim 11, further comprising:
    controlling a disk positioning unit to center the disk relative to a rotational spindle in response to the measured amount of eccentricity of the tracks.

13. The method of claim 11, further comprising:
    controlling movement of a read/write head relative to a selected track in response to the measured amount of eccentricity of the tracks.

14. The method of claim 11, further comprising:
    filtering the readback signal to attenuate amplitude variation cycles corresponding to an occurrence of dots in a down-track orientation on the bit patterned media.

15. The method of claim 11, comprising:
    measuring a range of eccentricity as a known fraction of the counted number of amplitude variation cycles in the readback signal.

16. The method of claim 11 and comprising the step of:
    DC erasing the tracks on the disk prior to measuring the amount of eccentricity.

17. A method comprising:
    differentiating a readback signal from a bit patterned media on a disk that includes a plurality of dots arranged in a down-track orientation and in a cross-track orientation to generate a differentiated readback signal;
    counting occurrences of zero-crossings in the differentiated readback signal over a defined time period; and
    measuring an amount of eccentricity of tracks on the disk in response to the counted number of zero-crossings in the differentiated readback signal.

18. The method of claim 17, further comprising:
    low pass filtering the readback signal before differentiating it to generate the differentiated readback signal, wherein the low pass filter is tuned to substantially attenuate frequencies in the readback signal that correspond to a readback rate of the plurality of dots in the down-track orientation.

19. A method comprising:
    filtering a readback signal from a bit patterned media that includes a plurality of dots arranged in a down-track orientation and in a cross-track orientation to substantially attenuate frequencies in the readback signal that correspond to a readback rate of occurrence of the plurality of dots in the down-track orientation;
    counting a number of peaks in the filtered readback signal that exceed a threshold value over a defined time period; and
    measuring an amount of eccentricity of tracks on the bit patterned media in response to the counted number of peaks.

20. A disk stack alignment apparatus comprising:
    a track eccentricity determination circuit configured to measure an amount of eccentricity of tracks on a disk in response to a readback signal, wherein the track eccentricity determination circuit counts a number of amplitude variation cycles in the readback signal over a time period and measures the amount of eccentricity in response to the number of amplitude variation cycles in the readback signal; and
    a disk positioning unit that controls centering of the disk relative to a rotational spindle in response to the measured amount of eccentricity of the tracks.

* * * * *